UNITED STATES PATENT OFFICE.

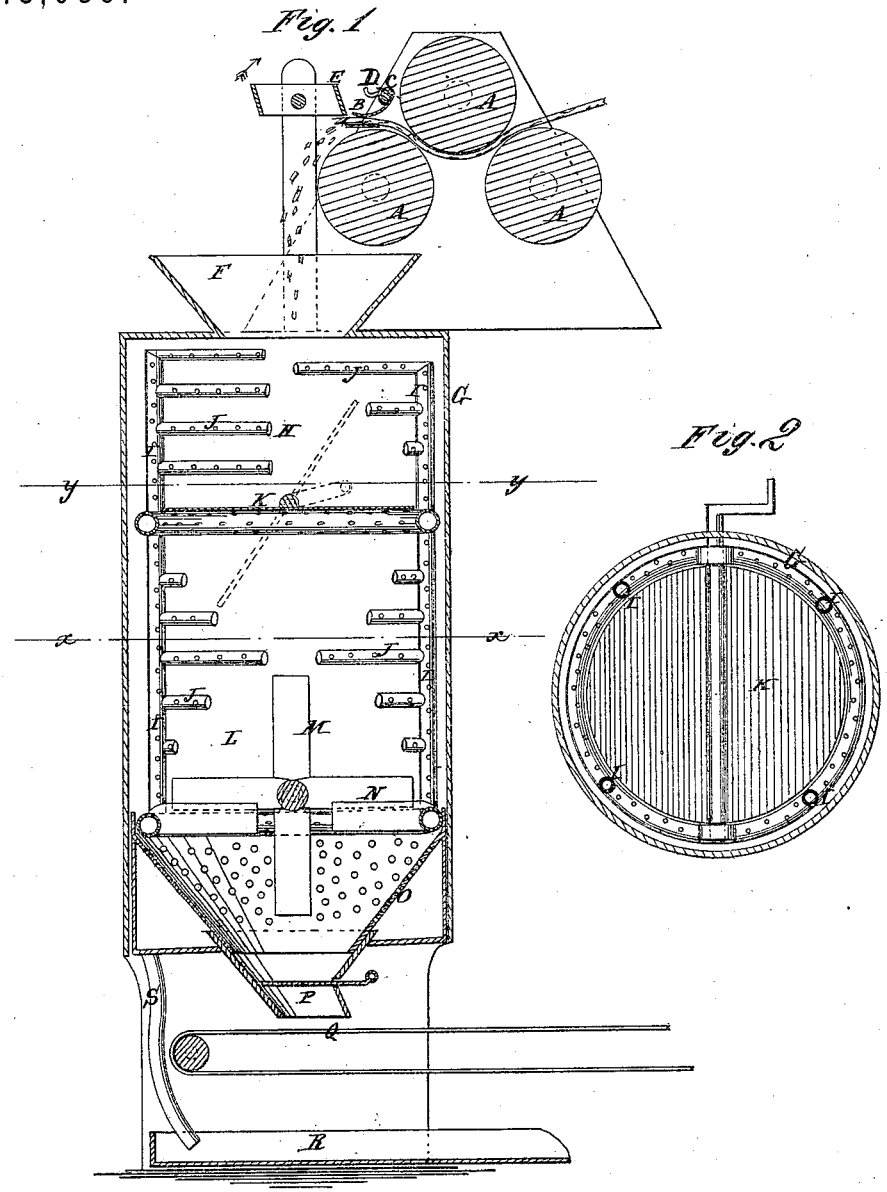

DUNCAN MOFFAT, OF NEW ORLEANS, LOUISIANA.

IMPROVEMENT IN APPARATUS FOR EXTRACTING CANE-JUICE.

Specification forming part of Letters Patent No. 143,089, dated September 23, 1873; application filed August 16, 1873.

*To all whom it may concern:*

Be it known that I, DUNCAN MOFFAT, of New Orleans, in the parish of Orleans and State of Louisiana, have invented a new and Improved Apparatus for Extracting Cane-Juice, of which the following is a specification:

My invention consists in the arrangement of a spring-compressing guide or holding device with the delivery-rolls of the mill and the rotary cutting apparatus, as hereinafter described. My invention also consists of a vat containing a secondary steaming-compartment under the one into which the crushed and chopped cane is first received, containing revolving chopping and beating blades; also, stationary ones to continue the disintegrating process until the cane is reduced to pulp; and the bottom of said compartment is perforated to filter the juice from the pulp as much as possible; and said bottom also has a spout leading from it to conduct the pulp to an endless carrier, by which it is delivered to pressing-rollers to expel the remaining juice.

The two compartments of the steaming-vat are separated by a valve, which is turned from time to time to deliver the cane to the lower compartment in batches, which have been subjected to the steam in the upper compartment a sufficient length of time. Below the filtering-bottom of the lower compartment there is a trough, which receives the juice falling down from said compartment, and conducts it to the evaporator.

Figure 1 is a longitudinal sectional elevation of my improved apparatus for extracting cane-juice. Fig. 2 is a horizontal section of Fig. 1 taken on the line $y\,y$, and Fig. 3 is a horizontal section taken on the line $x\,x$.

Similar letters of reference indicate corresponding parts.

A represents the rolls of a rolling-mill, on the discharging side of which is a pressure-guide, B, pivoted at C, and provided with springs D to hold it down to press the crushed cane down upon the surface of the delivering-roll, as shown in the drawing, to facilitate the cutting of it by rotary cutters E, arranged to work immediately in front of the guide. These rolls and cutting devices are arranged so that the cuttings fall into the hopper F upon the top of a steaming-vat, G, containing an upper compartment, H, into which the cuttings fall from the hopper. This hopper contains vertical and horizontal perforated pipes I J, from which steam is discharged into the mass of cane to saturate it, and dissolve the sugar-crystals and expel the juice. The steam will be supplied from a boiler having suitable connections with the perforated pipes. The bottom K of this compartment turns on a central shaft, and dumps the batch of cane when sufficiently steamed into another compartment, L, also having vertical and horizontal perforated steam-pipes I J, and also containing rotary cutters or beaters M, and stationary ones, N, for continuing the process of disintegration, and reducing the cane to pulp. The bottom O of this compartment is perforated, to allow the juice to escape from the cane; and said bottom is hopper-shaped, and terminates in a spout, P, through which the pulp is discharged, when the gate is open, to an endless apron, Q, by which it is conducted to pressing-rolls to have the remaining juice expressed, while the juice falls from the hopper upon a pan or trough, which conducts it to the evaporator R through a tube, S.

The cane can, of course, be conducted from the mill to the hopper F by elevators or conveyers; but by arranging the mill relatively to the hopper as here shown, the conveying apparatus can be dispensed with.

By this apparatus I expect to obtain all the juice from the cane, whereas only about sixty per cent. is obtained by the common crushing and pressing process.

Having thus described my invention, I claim as new and desire to secure by Letters Patent—

1. The arrangement of the compressing-guide B and spring D with the delivery-rolls A and the rotary cutters E, as and for the purpose specified.

2. The steaming-vat G, having an upper steaming-compartment, H, and a lower one, L, separated by the valve K, and the latter compartment having beaters M and N and a perforated bottom, O, substantially as specified.

3. The arrangement of the endless carrier Q and the trough R with the steaming and straining vat G, substantially as specified.

DUNCAN MOFFAT.

Witnesses:
JOHN R. JAEGER,
JULIUS F. HEINTZ.